United States Patent
Chung

(10) Patent No.: US 11,126,341 B2
(45) Date of Patent: Sep. 21, 2021

(54) OBJECT MANIPULATING METHOD, HOST DEVICE AND COMPUTER READABLE STORAGE MEDIUM

(71) Applicant: HTC Corporation, Taoyuan (TW)

(72) Inventor: Wei-Jen Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/747,457

(22) Filed: Jan. 20, 2020

(65) Prior Publication Data

US 2020/0272314 A1 Aug. 27, 2020

Related U.S. Application Data

(60) Provisional application No. 62/808,812, filed on Feb. 21, 2019.

(51) Int. Cl.
*G06F 3/0484* (2013.01)
*G06F 3/0481* (2013.01)
*G06F 3/01* (2006.01)

(52) U.S. Cl.
CPC .......... *G06F 3/04847* (2013.01); *G06F 3/011* (2013.01); *G06F 3/04812* (2013.01); *G06F 3/04815* (2013.01)

(58) Field of Classification Search
CPC .. G06F 3/04847; G06F 3/04812; G06F 3/011; G06F 3/04815; G06T 19/006
See application file for complete search history.

(56) References Cited

U.S. PATENT DOCUMENTS

| | | | | |
|---|---|---|---|---|
| 2013/0104087 | A1* | 4/2013 | Mlyniec | G06F 3/0346 715/849 |
| 2016/0092080 | A1* | 3/2016 | Swanson | G06F 3/04842 345/654 |
| 2017/0139578 | A1* | 5/2017 | Dickerson | G06F 3/04815 |
| 2018/0218538 | A1* | 8/2018 | Short | G06F 3/011 |
| 2019/0087019 | A1* | 3/2019 | Raja | G06F 3/0383 |
| 2019/0121500 | A1* | 4/2019 | Liddell | G06F 3/0484 |
| 2019/0129607 | A1* | 5/2019 | Saurabh | G06F 3/04817 |

FOREIGN PATENT DOCUMENTS

| | | |
|---|---|---|
| CN | 201662774 | 12/2010 |
| CN | 106774833 | 5/2017 |
| CN | 107977083 | 5/2018 |
| WO | 2009024971 | 2/2009 |

OTHER PUBLICATIONS

"Office Action of China Counterpart Application", dated Jan. 27, 2021, p. 1-p. 10.

\* cited by examiner

*Primary Examiner* — Mong-Shune Chung
(74) *Attorney, Agent, or Firm* — JCIPRNET

(57) ABSTRACT

The disclosure provides an object manipulating method, a host device and a computer readable storage medium. The method includes the following steps: in response to an operable object is selected, showing a cursor on the operable object; moving the cursor on the operable object in response to a movement of a controller; and moving the operable object according to the movement of the controller in response to a movement triggering event.

15 Claims, 8 Drawing Sheets

OBJECT MANIPULATING METHOD, HOST DEVICE AND COMPUTER READABLE STORAGE MEDIUM

CROSS-REFERENCE TO RELATED APPLICATION

This application claims the priority benefit of U.S. provisional application Ser. No. 62/808,812, filed on Feb. 21, 2019. The entirety of the above-mentioned patent application is hereby incorporated by reference herein and made a part of this specification.

BACKGROUND OF THE INVENTION

1. Field of the Invention

The present disclosure generally relates to a virtual reality (VR) technology, in particular, to an object manipulating method, a host device and a computer readable storage medium for manipulating objects in VR services.

2. Description of Related Art

In the VR world, it is difficult for users to perform adjustment and input because VR controllers need to be precisely adjusted, which requires very focused control. Consequently, developers are reluctant to make user interfaces that require fine movements. For example, the volume can be adjusted from 0 to 100 with a lever in the VR environment. Due to the limitation of the screen, the lever is usually not very wide. If the user wants to finely adjust the volume to be a value between 0 and 100, hands of the user must be highly stable. If this is too difficult, developers would prefer to use a less precise range, such as 0 to 10. Alternatively, the developer may design buttons for the user to perform adjustments, such as + and − buttons, but the whole adjustment would need the user to repeatedly perform movements of pushing buttons, instead of completing the adjustment at once.

The accuracy of the controller is often insufficient, and it is easy to jump and shake, which may provide an unsatisfying experience to the user. Specifically, the user has to use the controllers point to the screen and aim some small control points accurately, which may make the user exhausted. In addition, it is also difficult to design a convenient controlling way for the user to use VR in a lying position.

SUMMARY OF THE INVENTION

Accordingly, the disclosure is directed to an object manipulating method and a host device.

The disclosure provides an object manipulating method, which includes: in response to an operable object is selected, showing a cursor on the operable object; moving the cursor on the operable object in response to a movement of a controller; and moving the operable object according to the movement of the controller in response to a movement triggering event.

The disclosure provides a host device includes a storage circuit and a processor. The storage circuit stores a plurality of modules. The processor is coupled to the storage circuit and accessing the modules to execute following steps: in response to an operable object is selected, showing a cursor on the operable object; moving the cursor on the operable object in response to a movement of a controller; and moving the operable object according to the movement of the controller in response to a movement triggering event.

The disclosure provides a non-transitory computer readable storage medium, recording an executable computer program to be loaded by a host device to execute steps of: in response to an operable object is selected, showing a cursor on the operable object; moving the cursor on the operable object in response to a movement of a controller; and moving the operable object according to the movement of the controller in response to a movement triggering event.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
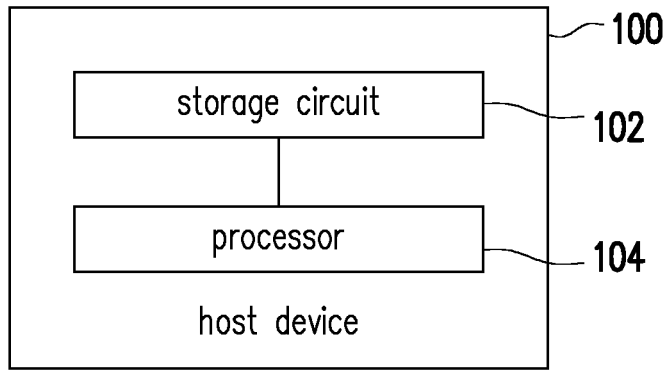
FIG. 1 is a functional diagram of a host device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Roughly speaking, the present disclosure provides an object manipulating method, which is designed to reduce the difficulty of selection and broaden the design habits of developers.

See FIG. 1, which is a functional diagram of a host device according to an embodiment of the disclosure. In various embodiments, the host device 100 may be implemented as a computer, a smart phone, a server, a tablet computer, or the like, but the disclosure is not limited thereto. In one embodiment, the host device 100 may be a part of a VR system including a head-mounted display, a pair of controllers, base stations, linked box, etc., and the host device 100 may be used to run a VR software for providing a VR service to the user thereof.

As shown in FIG. 1, the host device 100 may include a memory 102 and a processor 104. The memory 102 may be one or a combination of a stationary or mobile random access memory (RAM), read-only memory (ROM), flash memory, hard disk, or any other similar device, and which records a plurality of programs or modules that can be executed by the processor 104.

The processor 104 may be coupled to the memory 102. In various embodiments, the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

The processor 104 may access the programs stored in the memory 102 to perform the object manipulating method of the present disclosure, and the detailed discussions will be provided hereinafter.

Figure 2:
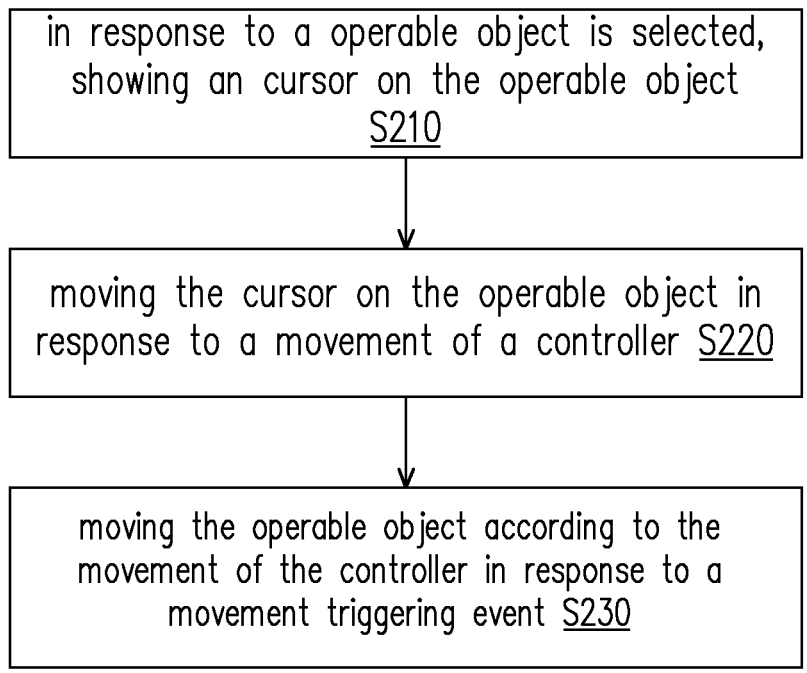
FIG. 2 is a flow chart of the object manipulating method according to an embodiment of the disclosure.

See FIG. 2, which is a flow chart of the object manipulating method according to an embodiment of the disclosure. The method of FIG. 2 may be performed by the host device 100 in FIG. 1, and the details of FIG. 2 would be discussed in accompanying with the elements shown in FIG. 1.

In addition, for facilitating the understanding of the disclosure, FIG. 3A to FIG. 3H, which are schematic views showing how an operable object is manipulated according to an embodiment of the disclosure, would be used as an example, but the disclosure is not limited thereto.

Figure 3C:
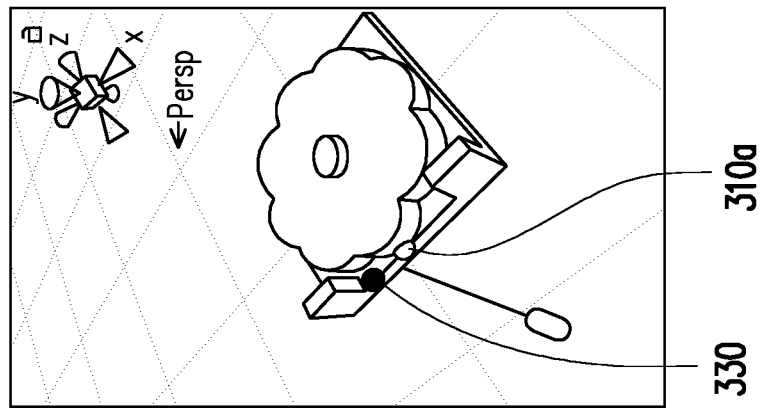
FIG. 3A to FIG. 3H are schematic views showing how an operable object is manipulated according to an embodiment of the disclosure.
Figure 3B:
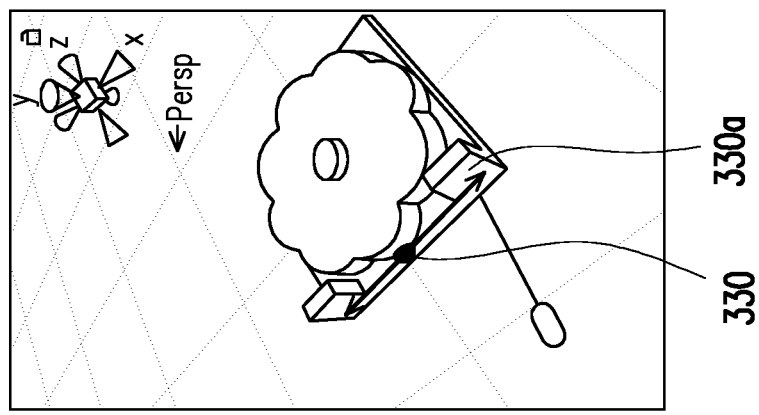
Figure 3A:
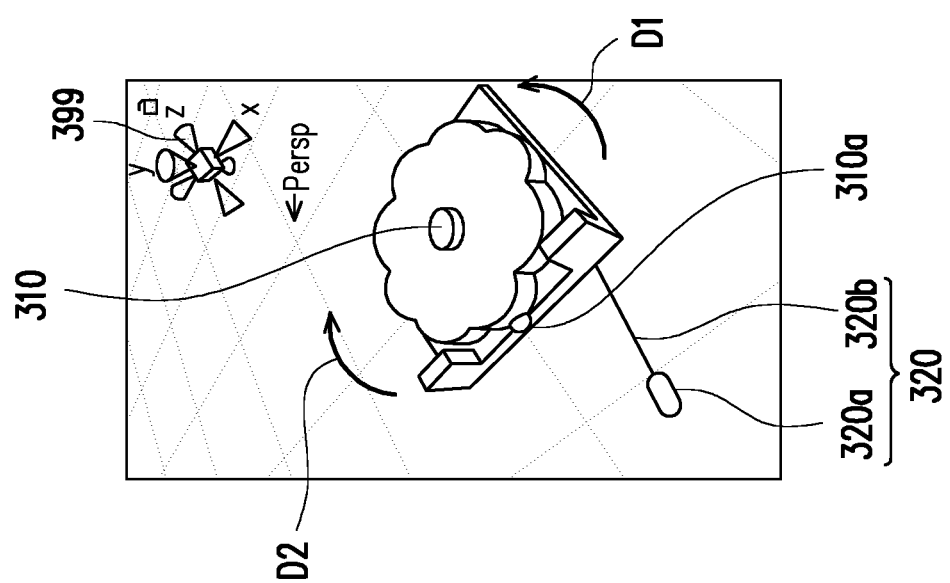

See FIG. 3A, an operable object 310 may be shown therein. In the embodiment, the operable object 310 may be a rotary plate in the VR environment, and the operable object 310 may be rotated toward directions D1 or D2 by the user by using controllers. For visual aid, the operable object 310 can be disposed with a reference spot 310a, which may facilitate the user to observe the rotation of the operable object 310. In addition, a controller representative 320 may be shown as well. The controller representative 320 may have an anchor portion 320a and a pointing portion 320b, wherein the anchor portion 320a may be designed to stay at the shown location instead of moving around in response to the movement of the controller, and the pointing portion 320b may be used to shown where the controller is currently pointing, but the disclosure is not limited thereto.

Moreover, FIG. 3A also shows a coordinate system 399, which may be a right-hand coordinate system. That is, the positive/negative rotation direction on each of the X-axis, Y-axis, and Z-axis of the coordinate system 399 may be defined based on the right hand rule. Therefore, by definition, the direction D1 may be a positive rotation direction on the Y-axis, the direction D2 may be a negative rotation direction on the Y-axis, and the operable object 310 is rotatable on the Y-axis.

In one embodiment, when the user wants to rotate the operable object 310, the user may use the pointing portion 320b to point at the operable object 310 and select the operable object 310 by, for example, pressing some specific buttons on the controller, but the disclosure is not limited thereto. In other embodiments, the user may select the operable object 310 with any known ways related to VR technologies.

See FIG. 2, in step S210, in response to the operable object 310 is selected, the processor 104 may show a cursor 330 on the operable object 310. In step S220, the processor 104 may move the cursor 330 on the operable object 310 in response to the movement of the controller.

In the embodiment, the cursor 330 may be used to inform the user about how the operable object 310 can be rotated, and the cursor 330 may be designed to be movable on one dimension in a visual window 330a. Specifically, after the cursor 330 is shown at a first position in the visual window 330a, the processor 104 may retrieve a plurality of controller vectors consecutively inputted by the controller.

In a first embodiment, for a first controller vector of the controller vectors, the processor 104 may obtain a first rotation component of the first controller vector on the rotation axis of the movement of the controller. That is, the processor 104 may retrieve the rotation component of the first controller vector on the Y-axis.

Next, for a second controller vector of the controller vectors, the processor 104 may obtain a second rotation component of the second controller vector on the rotation axis of the movement of the controller, wherein the second controller vector is subsequent to the first controller vector. That is, the processor 104 may retrieve the rotation component of the second controller vector on the Y-axis as well.

Thereafter, the processor 104 may obtain a rotation component difference between the first rotation component and the second rotation component. Since the second controller vector is subsequent to the first controller vector, the processor 104 may subtract the second rotation component from the first rotation component to obtain the rotation component difference.

In a second embodiment, for a first controller vector of the controller vectors, the processor 104 may obtain a first translation component of the first controller vector on a specific axis of the movement of the controller. In the second embodiment, the specific axis may be the axis to which the directions D1 and D2 correspond. Taking FIG. 3A as an example, since the directions D1 and D2 may be regarded as locating on a plane formed by X-axis and Z-axis, the X-axis or Z-axis may be chosen as the specific axis, but the disclosure is not limited thereto. In other embodiments, the specific axis may be any axis perpendicular to the rotation axis, but the disclosure is not limited thereto. For facilitating the following discussion, the X-axis would be regarded as the specific axis. That is, the processor 104 may retrieve the translation component of the first controller vector on the X-axis.

Next, for a second controller vector of the controller vectors, the processor 104 may obtain a second translation component of the second controller vector on the specific axis (e.g., the X-axis) of the movement of the controller, wherein the second controller vector is subsequent to the first controller vector. That is, the processor 104 may retrieve the translation component of the second controller vector on the X-axis as well.

Thereafter, the processor 104 may obtain a translation component difference between the first translation component and the second translation component. Since the second controller vector is subsequent to the first controller vector, the processor 104 may subtract the second translation component from the first translation component to obtain the translation component difference.

Accordingly, the processor 104 may move the cursor 330 from the first position exemplarily shown in FIG. 3B to a second position exemplarily shown in FIG. 3C based on the rotation component difference in the first embodiment or the translation component difference in the second embodiment.

In brief, in the scenario shown in FIG. 3B, the user may, for example, swipe the controller to the left to control the cursor 330 to correspondingly move. In response thereto, in the first embodiment, the processor 104 may move the cursor 330 to the left based on the aforementioned rotation component difference on the rotation axis (i.e., the Y-axis) of the operable object 310 between two consecutive controller vectors. In the second embodiment, the processor 104 may move the cursor 330 to the left based on the aforementioned translation component difference on the specific axis (i.e., the X-axis) of the operable object 310 between two consecutive controller vectors.

However, as mentioned in the above, since the cursor 330 is merely a visual aid, the operable object 310 would not be actually rotated along with the movement of the cursor 330. See FIG. 3D, even the cursor 330 is moved toward the other direction, the operable object 310 is not rotated.

Next, in step S230 of FIG. 2, the processor 104 may move the operable object 310 according to the movement of the controller in response to a movement triggering event. In one embodiment, the movement triggering event may be determined to be occurred when some specific buttons on the controller is (continuously) pressed while the cursor 330 is being shown in the visual window 330a, but the disclosure is not limited thereto.

Figure 3F:
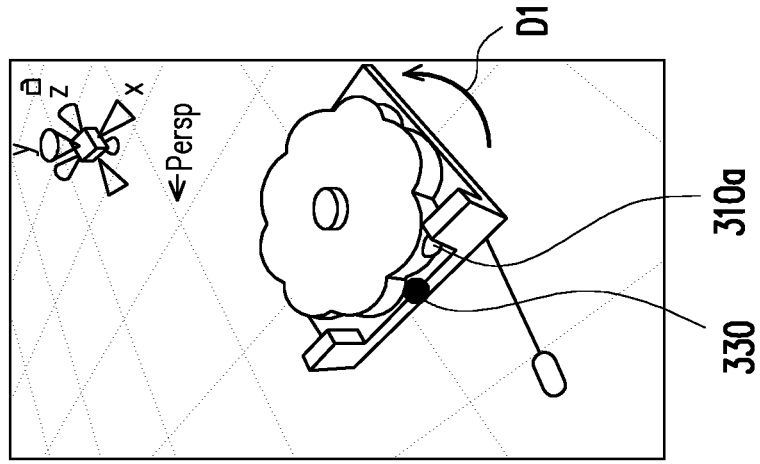
Figure 3E:
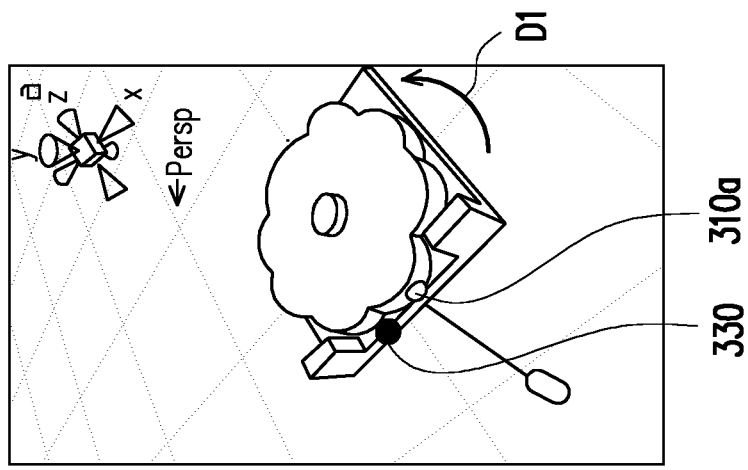
Figure 3D:
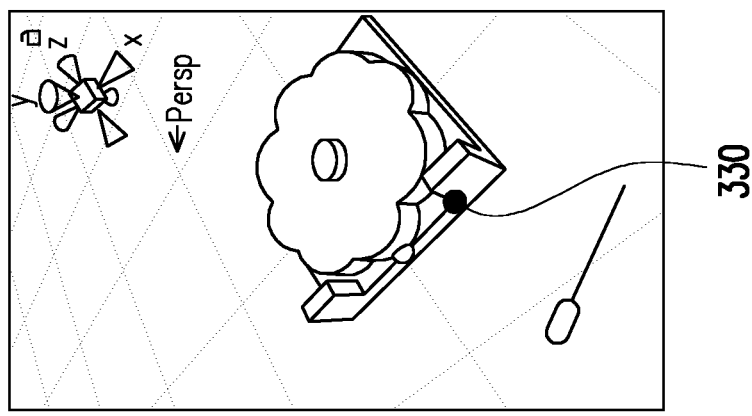
Figure 3H:
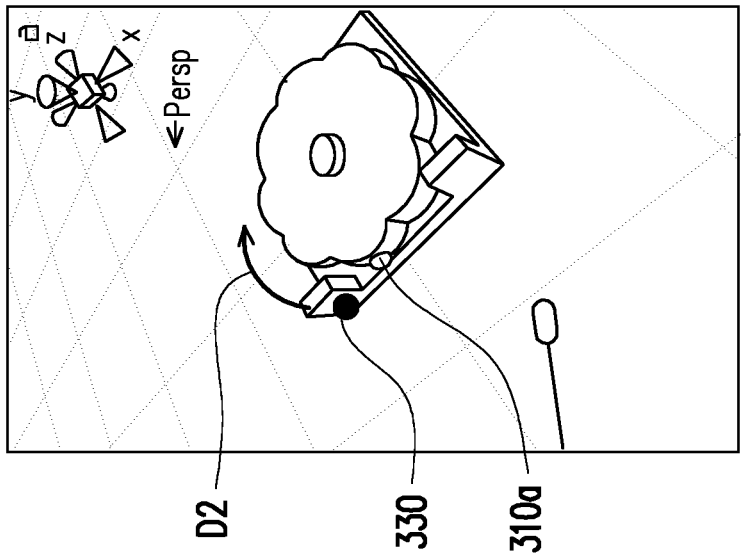
Figure 3G:
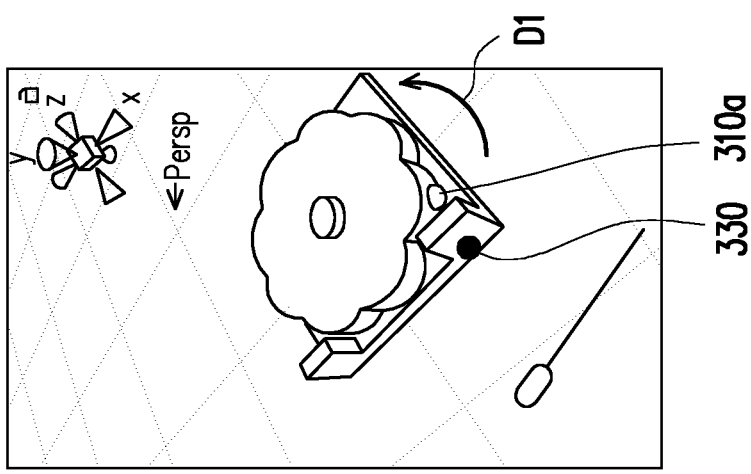

In the process shown in FIG. 3E, FIG. 3F, and FIG. 3G, when the user swipes the controller to the right while triggering the movement triggering event, the operable object 310 would be rotated toward the direction D1 according to the movement of the controller. From another perspective, the operable object 310 would be rotated toward the direction D1 according to the movement of the cursor 330.

In the present embodiment, the mechanism of rotating the operable object 310 may be similar to the mechanism of moving the cursor 330. Specifically, in the first embodiment, the processor 104 may retrieve a plurality of controller vectors consecutively inputted by the controller in response to the movement triggering event. For a first controller vector of the controller vectors, the processor 104 may obtain a first rotation component of the first controller vector on the rotation axis of the movement of the controller. For a second controller vector of the controller vectors, the processor 104 may obtain a second rotation component of the second controller vector on the rotation axis of the movement of the controller, wherein the second controller vector is subsequent to the first controller vector. Next, the processor 104 may obtain a rotation component difference between the first rotation component and the second rotation component and rotate the operable object 310 along the rotation axis (i.e., the Y-axis) based on the rotation component difference, but the disclosure is not limited thereto.

In the second embodiment, the processor 104 may retrieve a plurality of controller vectors consecutively inputted by the controller in response to the movement triggering event. For a first controller vector of the controller vectors, the processor 104 may obtain a first translation component of the first controller vector on the specific axis (i.e., the X-axis) of the movement of the controller. For a second controller vector of the controller vectors, the processor 104 may obtain a second translation component of the second controller vector on the specific axis of the movement of the controller, wherein the second controller vector is subsequent to the first controller vector. Next, the processor 104 may obtain a translation component difference between the first translation component and the second translation component and rotate the operable object 310 along the rotation axis (i.e., the Y-axis) based on the translation component difference, but the disclosure is not limited thereto.

Further, as can be observed in FIG. 3H, when the user swipes the controller to the left while triggering the movement triggering event, the operable object 310 would be rotated toward the direction D2 according to the movement of the controller.

In some embodiments, the user may stop the movement triggering event by, for example, releasing the specific buttons on the controller. In response thereto, the processor 104 would perform step S220 again to move the cursor 330 without rotating the operable object 310.

Moreover, as mentioned in the above, since the cursor 330 may be designed to be limited in the visual window 330a, the rotation of the operable object 310 would be correspondingly stopped when the cursor 330 reaches the boundary of the visual window 330a. In this case, if the user wants to repeatedly rotate the operable object 310 toward, for example, the direction D1, the user may repeatedly perform the following steps: (1) swiping the controller to the right while triggering the movement triggering event; and (2) stopping the movement triggering event and swiping the controller to the left.

It should be noted that although the embodiments in the above are described with the operable object 310 that can only be rotated on the Y-axis, the method of the disclosure may be generalized to be used to rotate other operable objects on multiple axis based on more complicated types of controller vectors.

In addition, the operable object 310 may be designed to correspond to a configuration value in the VR environment, such as volumes or a degree of a door/valve being opened. Therefore, along with the rotation of the operable object 310, the corresponding configuration value may be adjusted in response thereto. For example, when the operable object 310 is rotated toward the direction D1/D2, the configuration value may be increased/decreased, but the disclosure is not limited thereto.

Further, the processor 104 may adjust the configuration value corresponding to the operable object 310 according to a moving degree of the operable object 310. For example, the more the operable object 310 is rotated, the more the configuration value is adjusted.

As can be understood based on the above teachings, the object manipulating method of the disclosure provides the user with a novel way to operate the objects in the VR environments, such that both of the operation difficulty of the user and the development difficulty of the developer can be mitigated.

In other embodiments, the method provided in the disclosure may be used to operate other types of objects and adjust corresponding configuration value, which would be discussed in the following.

In one embodiment, it is assumed that there is a configuration value ranging between a first configuration boundary value (e.g., 0) and a second configuration boundary value (e.g., 2000). As the indicator is shown in the visual window, the indicator may be disposed at a predetermined position in the visual window and indicate the configuration value (e.g., 550). The visual window corresponds to a numerical range, and the numerical range is between a first window boundary and a second window boundary value. In the embodiment, the indicator may be assumed to point at a center of the visual window. In this case, the numerical range of the visual window may be between 100 (i.e., 550−900/2) and 1000 (i.e., 550+900/2). Further, the numerical range is mapped to a normalized range between 0 and 1.

Next, as the controller is moved, the rotation component difference in the first embodiment or the translation component difference in the second embodiment may be mapped to an offset value based on the numerical range, wherein the offset value is between 0 and 1. In some embodiments, the way of the rotation component difference or the translation component difference being mapped to the offset value may be designed based on the developer's requirement. For example, if the rotation component difference in the first embodiment is +1 degree (e.g., the anchor portion 320a has been rotated by +1 degree), the offset value may be increased by 0.01. That is, the offset value may be obtained by dividing the rotation component difference by 100, but the disclosure is not limited thereto. For another example, if the translation component difference in the second embodiment is +1 (e.g., the controller has been moved to the positive X direction by 1 if the specific axis is assumed to be the X-axis), the offset value may be increased by 0.01. That is, the offset value may be obtained by dividing the translation component difference by 100, but the disclosure is not limited thereto.

Assuming that the offset value is +0.2, the processor 104 may calculate a shift value by multiplying a window difference with the offset value, wherein the window difference is a difference between the first window boundary and the second window boundary. For example, the window difference may be 900 (i.e., 1000−100), and the shift value may be 180 (i.e., 900×0.2). Thereafter, the processor 104 may add the configuration value by the shift value to update the configuration value. For example, the updated configuration value may be 730 (i.e., 550+180). The processor 104 may update the numerical range of the visual window by adding the shift value to the first window boundary and the second window boundary. That is, the updated numerical range may be between 280 (i.e., 100+180) and 1180 (i.e., 1000+180).

Figure 4A:
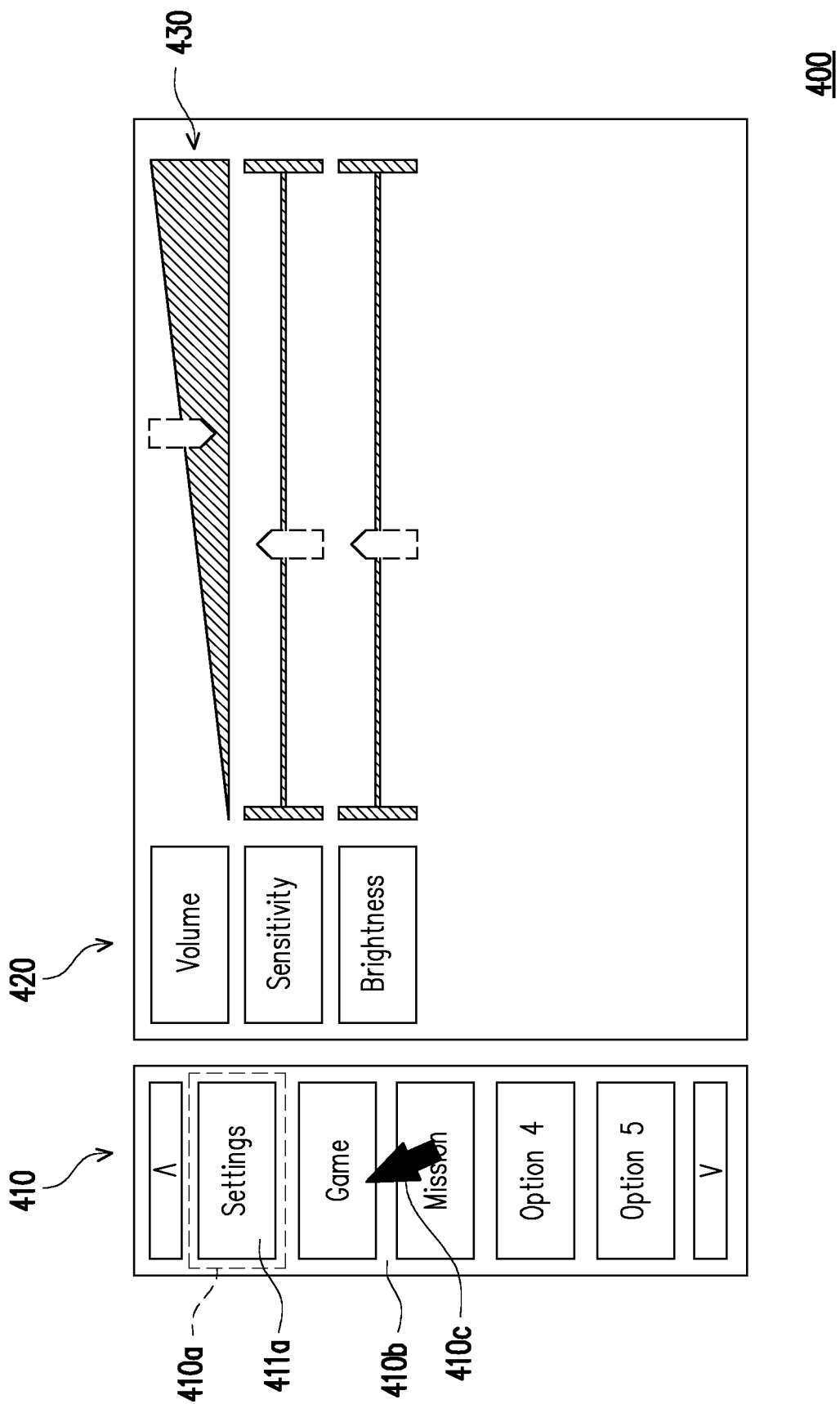
FIG. 4A to FIG. 4C are schematic views of manipulating objects according to one embodiment of the disclosure.
Figure 4B:
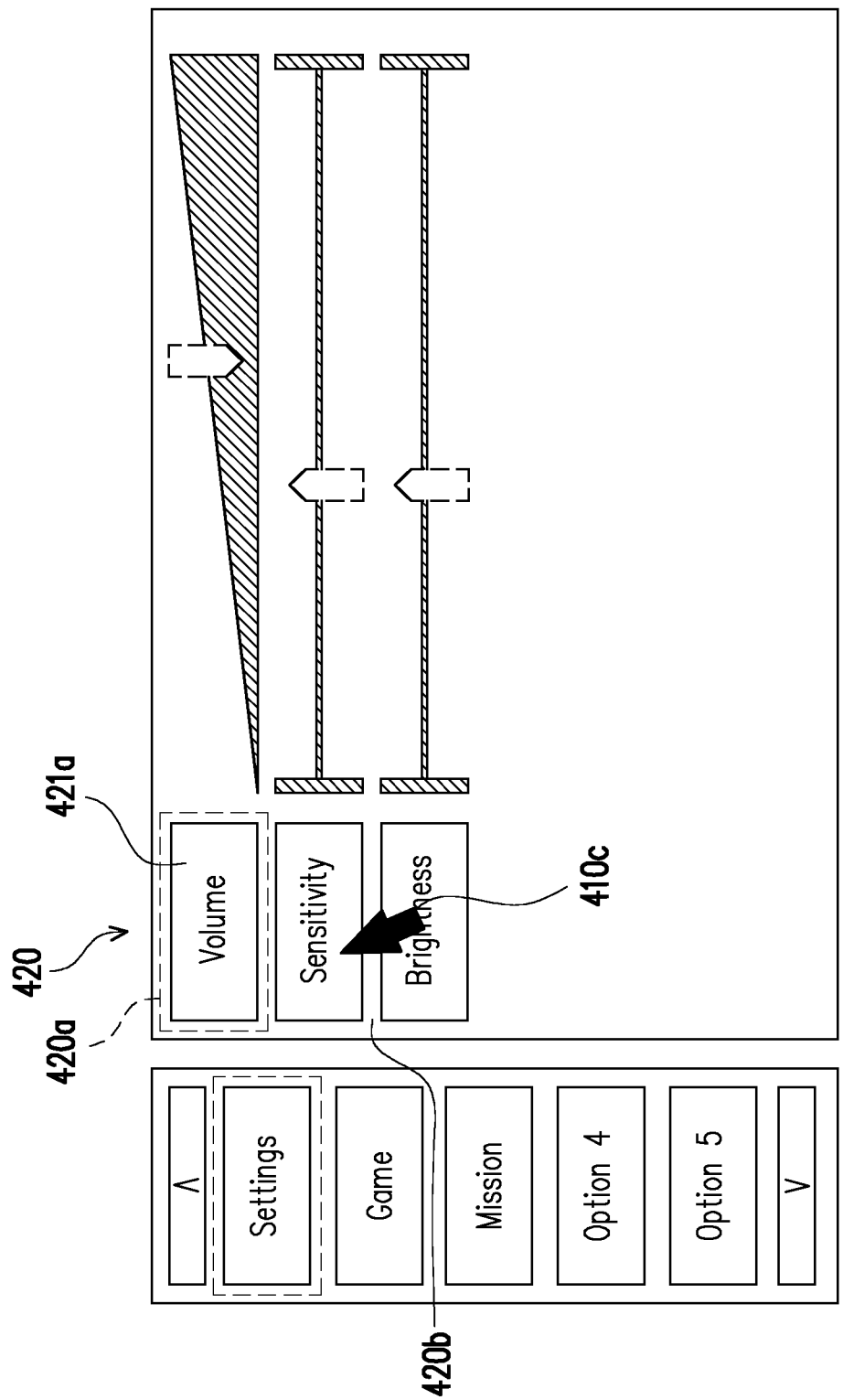
Figure 4C:
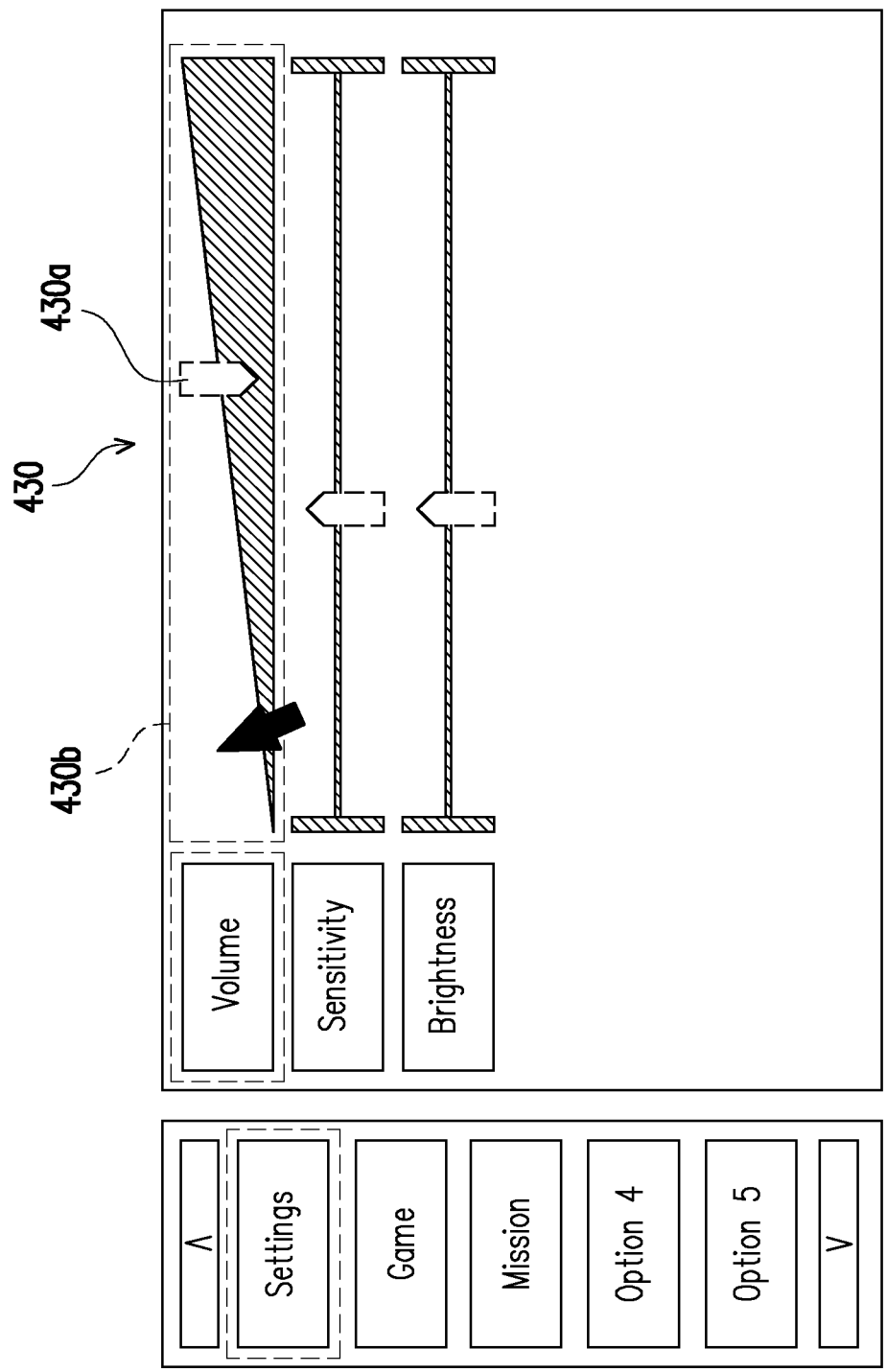

See FIG. 4A to FIG. 4C, which are schematic views of manipulating objects according to one embodiment of the disclosure. In FIG. 4A, the interface 400 may be a VR interface for the user to adjusting configurations. As shown in FIG. 4A, the interface 400 includes operable objects 410, 420, and 430, wherein the operable objects 410 and 420 may be menus including options, respectively, and the operable object 430 may be an adjustable bar.

In FIG. 4A, it can be assumed that the operable object 410 is selected, and hence an indicator 410a is accordingly shown in the visual window 410b of the operable object 410. The configuration value corresponding to the operable object 410 may be mapped to one of the options in the operable object 410.

Specifically, the configuration value may range between a first configuration boundary value and a second configuration boundary value. In FIG. 4A, it is assumed that the operable object 410 is a scrollable menu that includes eight options, and the visual window 410b currently shows five of the eight options. In this case, the configuration value corresponding to the operable object 410 may range between 0 (i.e., the first configuration boundary value) and 7 (i.e., the second configuration boundary value).

In the scenario shown in FIG. 4A, the configuration value may be mapped to the option 411a, which is indicated by the indicator 410a. In addition, the visual window 410b may be defined to correspond to a numerical range, which may be defined to be between a first window boundary and a second window boundary value. In FIG. 4A, the numerical range of the visual window may be between 1 (i.e., the first window boundary) and 5 (i.e., the second window boundary), and since there are five visible options in the operable object 410, and the window difference may be 5.

Moreover, the cursor 410c may be shown in the visual window 410b as well, and the cursor 410c may be moved based on mechanisms similar to the mechanism of moving the cursor 330.

Based on the similar mechanism of moving the cursor 410c, the indicator 410a may be moved, for example, downward along with the movement of the controller moving downward. For example, in the first embodiment, the rotation component difference on rotation axis (which may be regarded as the X-axis or the horizontal axis in this case) between consecutive controller vectors may be obtained to determine how to move the cursor 410c and the indicator 410a. In the second embodiment, the translation component difference on the specific axis (which may be regarded as the Y-axis or the vertical axis in this case) between consecutive controller vectors may be obtained to determine how to move the cursor 410c and the indicator 410a. Detailed discussion about the rotation/translation component differences may be referred to the previous embodiments, which would not be repeated herein.

However, it is assumed that the user directly selects the option 411a, which may lead to the scenario shown in FIG. 4B.

In the scenario shown in FIG. 4B, the configuration value may be mapped to the option 421a, which is indicated by the indicator 420a. In addition, the visual window 420b may be defined to correspond to a numerical range, which may be defined to be between a first window boundary and a second window boundary value. In FIG. 4B, the numerical range of the visual window may be between 0 (i.e., the first window boundary) and 2 (i.e., the second window boundary), and since there are three visible options in the operable object 420, and the window difference may be 3.

Moreover, the cursor 410c may be shown in the visual window 420b as well, and the cursor 410c may be moved based on the above mechanisms.

Based on the mechanism similar to moving the cursor 410c, the indicator 420a may be moved, for example, downward along with the movement of the controller moving downward.

However, it is assumed that the user directly selects the option 421a, which may lead to the scenario shown in FIG. 4C.

In the scenario shown in FIG. 4C, the configuration value may range between a first configuration boundary value (e.g., 0) and a second configuration boundary value (e.g., 100). The indicator 430a may be used to indicate the current configuration, and the indicator 430a may be moved in the visual window 430b according to the movement of the controller.

Moreover, the cursor 410c may be shown in the visual window 430b as well, and the cursor 410c may be moved based on the above mechanisms.

Based on the teachings of the previous embodiments, the indicator 430a may be horizontally moved along with the movement of the controller moving horizontally. For example, in the first embodiment, the rotation component difference on rotation axis (which may be regarded as the Y-axis or the vertical axis in this case) between consecutive controller vectors may be obtained to determine how to move the indicator 430a. In the second embodiment, the translation component difference on the specific axis (which may be regarded as the X-axis or the horizontal axis in this case) between consecutive controller vectors may be obtained to determine how to move the indicator 430a.

That is, the scenario in FIG. 4C may be regarded as moving the indicator 430a to point at different configuration values. However, in other embodiments, the position of the indicator may be fixed, and the numerical range of the visual window may be adjusted along with the movement of the controller.

Figure 5:
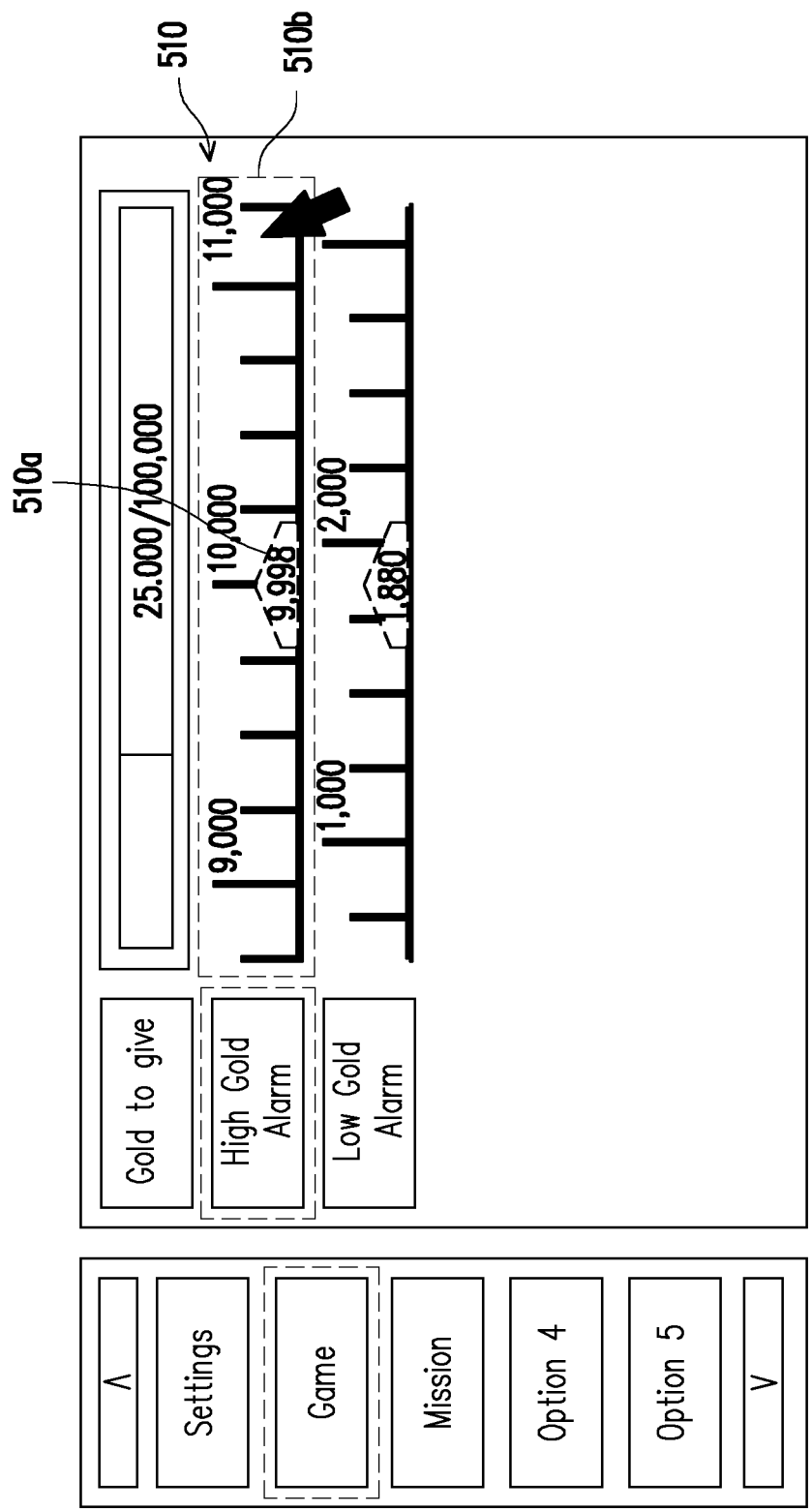
FIG. 5 is a schematic view of adjusting the numerical range of the visual window along with the movement of the controller according to an embodiment of the disclosure.

See FIG. 5, which is a schematic view of adjusting the numerical range of the visual window along with the movement of the controller according to an embodiment of the disclosure. In FIG. 5, it is assumed that the configuration value indicated by the indicator 510a in the operable object 510 is 9,998, and the configuration value may be adjusted between 0 and ∞. The visual window 510b corresponds to a numerical range whose corresponding window difference may be 2500, and the numerical range is between a first window boundary and a second window boundary value. In the embodiment, the indicator 510a may be assumed to fixedly point at a center of the visual window 510b. In FIG. 5, the numerical range of the visual window 510b may be adjusted along with the movement of the controller, and the detail thereof may be referred to the descriptions of the first embodiment, which would not be repeated herein.

The present invention further provides a computer readable storage medium for executing foregoing object manipulating method. The computer readable storage medium is composed of a plurality of program instructions (for example, a setting program instruction and a deployment program instruction) embodied therein. These program instructions can be loaded into an electronic device (e.g., the host device 100) and executed by the same to execute the object manipulating method and the functions of the electronic device described above.

In summary, the object manipulating method, the host device and the computer readable storage medium of the disclosure provide the user with a novel way to operate the objects (such as rotating objects and/or adjusting configuration values) in the VR environments. Accordingly, the user may perform fine adjustment with ease, and the adjustment may be completed at once. As a result, both of the operation difficulty of the user and the development difficulty of the developer can be mitigated.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An object manipulating method, comprising:
   in response to an operable object is selected, showing a cursor on the operable object, wherein the operable object is a virtual reality object in a virtual reality environment and the operable object is disposed with a visual window for showing the cursor;
   moving the cursor in the visual window of the operable object in response to a movement of a controller, wherein the controller is a virtual reality controller of a virtual reality system; and
   moving the operable object according to the movement of the controller in response to a movement triggering event, wherein the operable object is rotatable on a rotation axis, and the step of moving the operable object according to the movement of the controller in response to the movement triggering event comprising:
      retrieving a plurality of controller vectors consecutively inputted by the controller in response to the movement triggering event;
      for a first controller vector of the controller vectors, obtaining a first translation component of the first controller vector on a specific axis of the movement of the controller;
      for a second controller vector of the controller vectors, obtaining a second translation component of the second controller vector on the specific axis of the movement of the controller, wherein the second controller vector is subsequent to the first controller vector;
      obtaining a translation component difference between the first translation component and the second translation component; and
      rotating the operable object along the rotation axis based on the translation component difference.

2. The method according to claim 1, further comprising:
   adjusting a configuration value corresponding to the operable object according to a rotation degree of the operable object.

3. The method according to claim 1, wherein the step of moving the cursor in the visual window in response to the movement of the controller comprising:
   retrieving the plurality of controller vectors consecutively inputted by the controller after the cursor is shown at a first position in the visual window;
   obtaining a first rotation component of the first controller vector on the rotation axis of the movement of the controller;
   obtaining a second rotation component of the second controller vector on the rotation axis of the movement of the controller;
   obtaining a rotation component difference between the first rotation component and the second rotation component; and
   moving the cursor from the first position to a second position based on the rotation component difference.

4. The method according to claim 1, wherein the step of moving the operable object according to the movement of the controller in response to the movement triggering event further comprising:
   obtaining a first rotation component of the first controller vector on the rotation axis of the movement of the controller;
   obtaining a second rotation component of the second controller vector on the rotation axis of the movement of the controller;
   obtaining a rotation component difference between the first rotation component and the second rotation component.

5. The method according to claim 4, further comprising:
   adjusting a configuration value corresponding to the operable object according to a moving degree of the operable object.

6. The method according to claim 5, wherein the configuration value is shown in the visual window and indicated by the cursor, the configuration value ranges between a first configuration boundary value and a second configuration boundary value, the cursor is disposed at a predetermined position in the visual window, the visual window corresponds to a numerical range, the numerical range is between a first window boundary and a second window boundary value, and the numerical range is mapped to a normalized range between 0 and 1, wherein:
   the rotation component difference is mapped to an offset value based on the numerical range, wherein the offset value is between 0 and 1;
   calculating a shift value by multiplying a window difference with the offset value, wherein the window difference is a difference between the first window boundary and the second window boundary;
   adding the configuration value by the shift value to update the configuration value:
   updating the numerical range of the visual window by adding the shift value to the first window boundary and the second window boundary.

7. The method according to claim 1, wherein the step of moving the cursor in the visual window in response to the movement of the controller comprising:
   retrieving the plurality of controller vectors consecutively inputted by the controller after the cursor is shown at a first position in the visual window;

moving the cursor from the first position to a second position based on the translation component difference.

8. The method according to claim 1, further comprising:
adjusting a configuration value corresponding to the operable object according to a moving degree of the operable object.

9. A host device, comprising:
a storage circuit, storing a plurality of modules;
a processor, coupled to the storage circuit and accessing the modules to execute following steps:
in response to an operable object is selected, showing a cursor on the operable object, wherein the operable object is a virtual reality object in a virtual reality environment and the operable object is disposed with a visual window for showing the cursor;
moving the cursor in the visual window of the operable object in response to a movement of a controller, wherein the controller is a virtual reality controller of a virtual reality system; and
moving the operable object according to the movement of the controller in response to a movement triggering event, wherein the operable object is rotatable on a rotation axis, and the processor performs:
retrieving a plurality of controller vectors consecutively inputted by the controller in response to the movement triggering event;
for a first controller vector of the controller vectors, obtaining a first translation component of the first controller vector on a specific axis of the movement of the controller;
for a second controller vector of the controller vectors, obtaining a second translation component of the second controller vector on the specific axis of the movement of the controller, wherein the second controller vector is subsequent to the first controller vector;
obtaining a translation component difference between the first translation component and the second translation component; and
rotating the operable object along the rotation axis based on the translation component difference.

10. The host device according to claim 9, wherein the processor is further configured to:
adjust a configuration value corresponding to the operable object according to a rotation degree of the operable object.

11. The host device according to claim 9, wherein the processor is configured to:
retrieve the plurality of controller vectors consecutively inputted by the controller after the cursor is shown at a first position in the visual window;
obtain a first rotation component of the first controller vector on the rotation axis of the movement of the controller;
obtain a second rotation component of the second controller vector on the rotation axis of the movement of the controller;
obtain a rotation component difference between the first rotation component and the second rotation component; and
move the cursor from the first position to a second position based on the rotation component difference.

12. The host device according to claim 9, wherein the processor is configured to:
obtain a first rotation component of the first controller vector on the rotation axis of the movement of the controller;
obtain a second rotation component of the second controller vector on the rotation axis of the movement of the controller;
obtain a rotation component difference between the first rotation component and the second rotation component.

13. The host device according to claim 12, further comprising:
adjust a configuration value corresponding to the operable object according to a moving degree of the operable object.

14. The host device according to claim 13, wherein the configuration value is shown in the visual window and indicated by the cursor, the configuration value ranges between a first configuration boundary value and a second configuration boundary value, the cursor is disposed at a predetermined position in the visual window, the visual window corresponds to a numerical range, the numerical range is between a first window boundary and a second window boundary value, and the numerical range is mapped to a normalized range between 0 and 1, wherein the processor is configured to:
mapping the rotation component difference to an offset value based on the numerical range, wherein the offset value is between 0 and 1;
calculate a shift value by multiplying a window difference with the offset value, wherein the window difference is a difference between the first window boundary and the second window boundary;
add the configuration value by the shift value to update the configuration value:
update the numerical range of the visual window by adding the shift value to the first window boundary and the second window boundary.

15. A non-transitory computer readable storage medium, recording an executable computer program to be loaded by a host device to execute steps of:
in response to an operable object is selected, showing a cursor on the operable object, wherein the operable object is a virtual reality object in a virtual reality environment and the operable object is disposed with a visual window for showing the cursor;
moving the cursor in the visual window of the operable object in response to a movement of a controller, wherein the controller is a virtual reality controller of a virtual reality system; and
moving the operable object according to the movement of the controller in response to a movement triggering event, wherein the operable object is rotatable on a rotation axis, and the step of moving the operable object according to the movement of the controller in response to the movement triggering event comprising:
retrieving a plurality of controller vectors consecutively inputted by the controller in response to the movement triggering event;
for a first controller vector of the controller vectors, obtaining a first translation component of the first controller vector on a specific axis of the movement of the controller;
for a second controller vector of the controller vectors, obtaining a second translation component of the second controller vector on the specific axis of the movement of the controller, wherein the second controller vector is subsequent to the first controller vector;
obtaining a translation component difference between the first translation component and the second translation component; and rotating the operable object along the rotation axis based on the translation component difference.

\* \* \* \* \*